Sept. 29, 1925.
R. L. WOODRUFF
1,555,740
COTTON DUSTING MACHINE
Filed Aug. 1, 1924    3 Sheets-Sheet 3
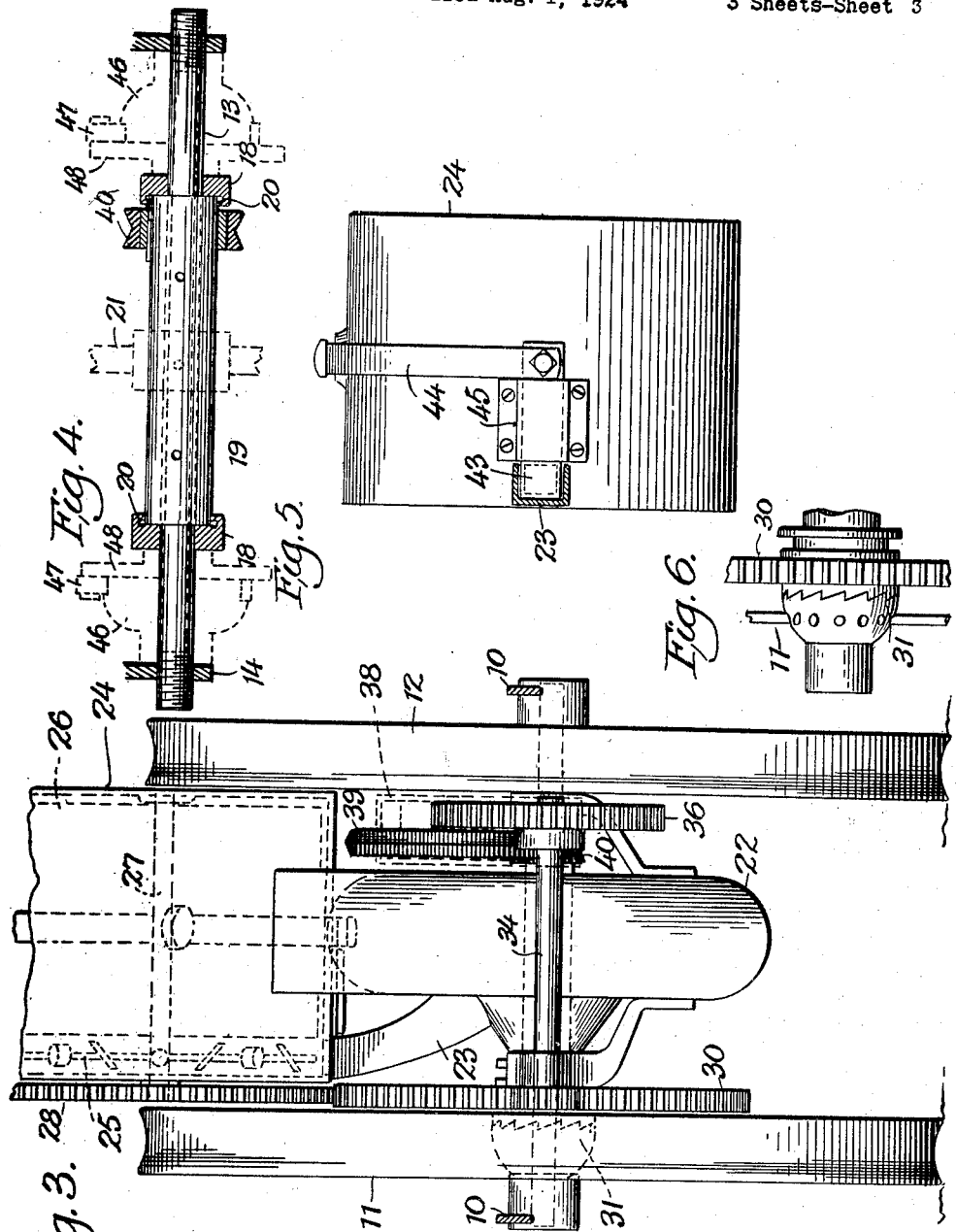
Inventor
Robert L. Woodruff,
By
Attorneys Patented Sept. 29, 1925.

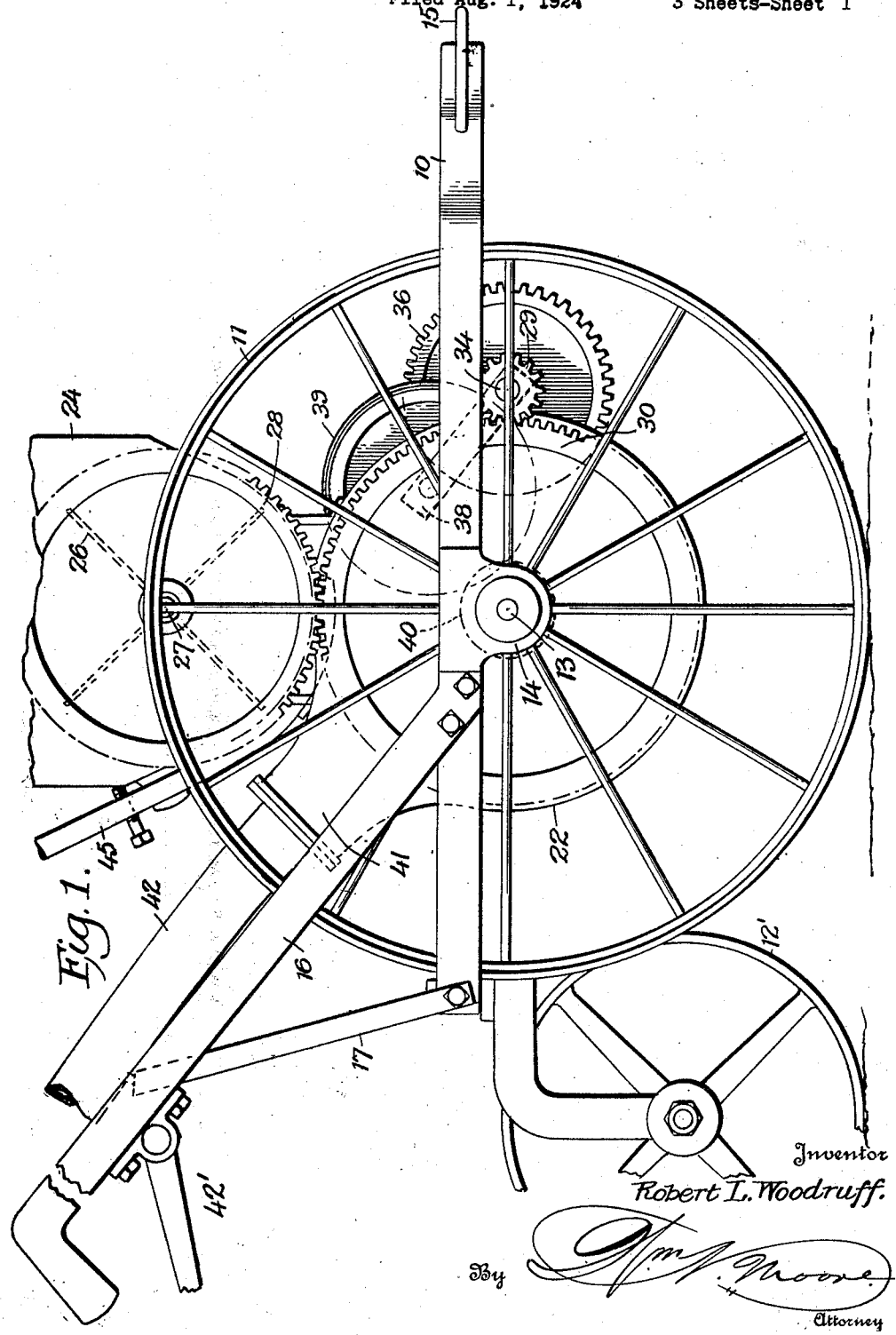

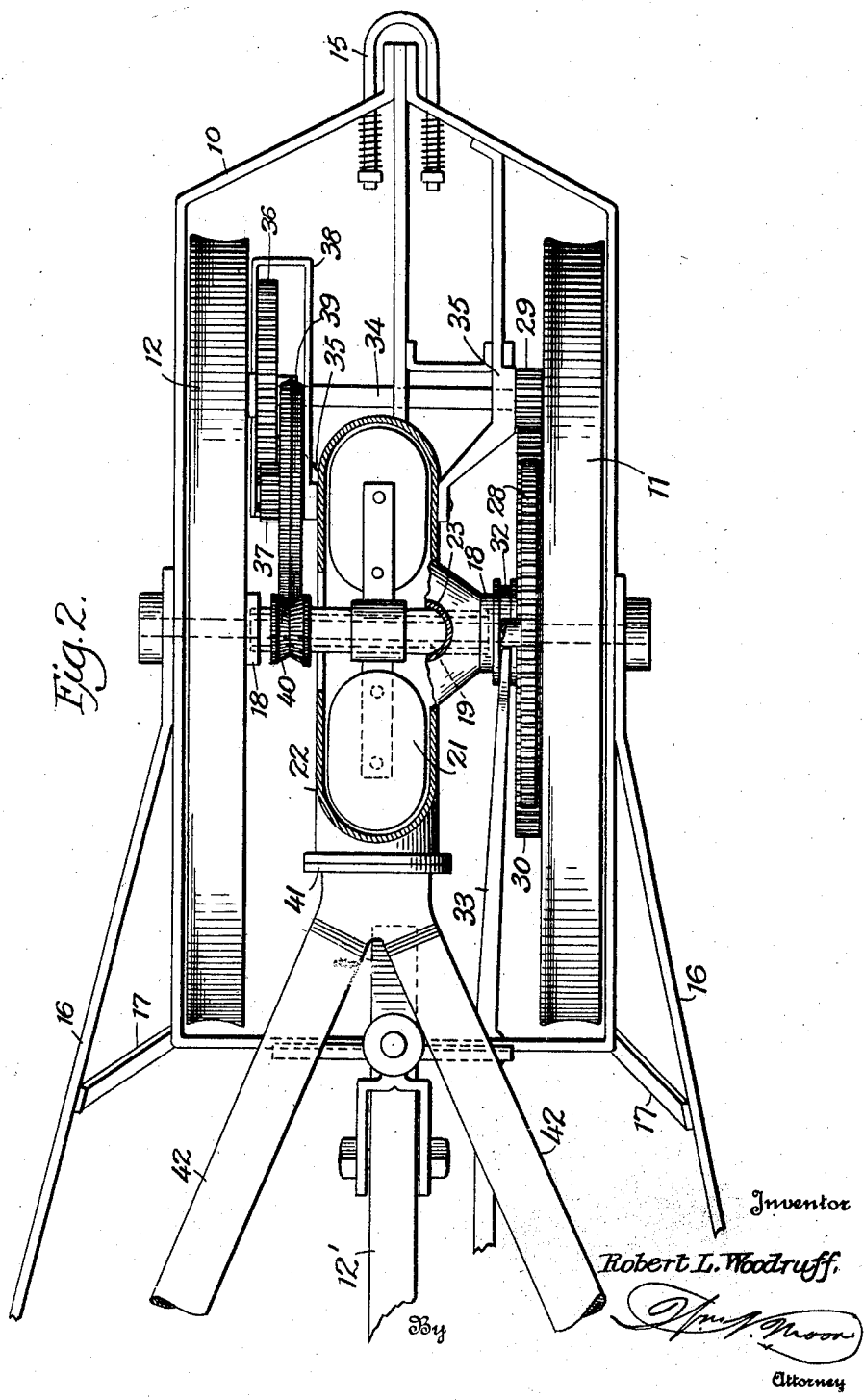

1,555,740

UNITED STATES PATENT OFFICE.

ROBERT LEE WOODRUFF, OF WINDER, GEORGIA, ASSIGNOR TO WOODRUFF COTTON DUSTER CO., INC., OF WINDER, GEORGIA.

COTTON-DUSTING MACHINE.

Application filed August 1, 1924. Serial No. 729,537.

*To all whom it may concern:*

Be it known that I, ROBERT L. WOODRUFF, a resident of Winder, in the county of Barrow and State of Georgia, a citizen of the United States, have invented certain new and useful Improvements in Cotton-Dusting Machines, of which the following is a specification.

This invention relates to cotton dusters or machines for spraying plants with poisonous dusts to destroy injurious insects that may infest the buds or bulbs of the plants and the object of the invention is to produce a machine of minimum weight that may be drawn by horse power along the rows of plants and automatically discharge the poisonous powder.

Another object of the invention is to combine the principal hollow operating shafts and adapt a sleeve as a fan operating shaft and mounting the same on the hollow axle thereby making the machine more compact and stronger, as well as a continuous oiling supply from the hollow axle plugged at both ends to contain oil and supply it at every turn, and locating the fan concentric with the supporting wheels.

A further object of the invention is the mounting of the hopper directly over the wheels and the fan so that the machine is not over balanced in either direction and the entire weight is thrown vertically on the wheels while the machine is being operated.

Another object of the invention is to provide sufficient gearing to provide a blast of air to carry the poisonous powder with such force as to not only spray the upper surface of the bolls and leaves, but to cause the dust to rebound from the earth and strike the under side of said bolls and leaves and thus to thoroughly cover the parts of the plants that are attacked by the insects and afford complete protection.

Lastly, a further object is to interpose frictional wheels in the gearing to protect the fan against injury in case it should be obstructed by lumps of the poison or foreign particles therein.

These and other objects and details of the invention are more fully described in the following specification, set forth in the appended claims and illustrated in the accompanying drawings, wherein:

Figure 1 is a side elevation of the improved cotton duster.

Fig. 2 is a plan view of the same with the hopper removed and the fan casing in section.

Fig. 3 is a front view of the machine with the frame in section.

Fig. 4 is a detail view of the shafts.

Fig. 5 is a bottom view of the hopper.

Fig. 6 is a detail view of the connecting clutch.

The machine consists of a substantially rectangular frame 10 mounted on the two wheels 11 and 12 while the latter are free to rotate on a spindle 13 running loose at each end in bracket 14 at the sides of the frame. A swivelled wheel 12' supports the frame at its rear.

A spring shock-absorbing clevis 15 is provided for the front of the frame 10, while from the rear, handles 16 extend and have braces 17 to strengthen them.

Journalled on the spindle 13 and between brackets 18 is a hollow shaft 19 whose ends are fitted in sockets in the brackets that have oil ducts 20 to thoroughly lubricate the shaft which carries the fan 21.

The fan rotates within the casing 22 having at one side the chute 23 (Fig. 3) from the hopper 24 that is mounted on the said casing and contains the agitator 25 and the sweep arch-breaker 26 both mounted on the shaft 27 journalled in the sides of hopper and having at its outer end the gear wheel 28.

Loosely carried on the bracket 18 at the inlet to the casing 21 is a gear wheel 30 that is connected with the wheel 11 by means of the clutch 31 (Figs. 3 and 6) whose members comprise the hub of wheel 11 and the circumferentially grooved sleeve 32 of the gear wheel that may be provided with a shifting fork 33 that plays in the groove of the sleeve 32.

The gear wheel 30 meshes with and drives the wheel 28 and a pinion 29 whose shaft 34 is journalled in brackets 35 that brace the main frame and the fan casing, and at the end of the shaft 34 from the pinion 29 is a gear wheel 36 meshing with a pinion 37 on a stud rotating in a small frame 38 and also carrying a friction wheel 39 that drives a small friction wheel 40 on one end of the hollow shaft 19.

When the clutch 31 is connecting the wheel 30 with the drive wheel 11 the above described train of gears is rotating the fan 21 at a greatly increased rate of speed and the agitator is carrying the powder to the chute 23 and delivering it to the fan which through the train of gearing above described is driven at a very rapid rate and delivers the powder through the nozzle or outlet 41 that is bifurcated to carry the two flexible pipes 42 and passed to the rear of the machine and operator and is released through suitable nozzles as desired in the form of a cloud of dust.

The supply of poisonous powder from the hopper may be regulated by gate 43 (Fig. 5) that is reciprocated over the chute opening by a lever 44 extending rearward as shown in Fig. 1 and the said gate is held in a guideway 45. By this means the supply of powder may be completely shut off or limited according to the infection of the plants.

The pipes 42 are adjustable by means of a lever 42′ as is commonly done in this class of machines.

The above described construction provides a substantial device where the weight, though limited, is directed upon the driving wheels and not thrown upon either the horse or the operator. It will be observed that the gearing is so disposed that it is equally distributed at the sides of the machine and is equalized by the distributing pipes at the rear.

It is obvious that the parts may be otherwise arranged or modified without departing from the essential features above described or from the scope of the appended claims.

What I claim as new is:

1. In a cotton duster, the combination of supporting wheels and a hollow spindle having an oil reservoir, a sleeve rotatable on the spindle and between the wheels and adapted to be fed by the oil reservoir, a fan mounted on the sleeve, a casing for the fan and having distributing pipes, a hopper above the fan casing, and means driven by one of the supporting wheels for rotating the fan.

2. In a cotton duster, the combination of supporting wheels, a spindle carrying the same, a rotating sleeve on the spindle between the wheels, a fan on the sleeve, a casing about the fan and carrying distributing pipes, a hopper above the casing and having a chute to deliver its contents into the said casing, an agitator in the hopper, and means connecting the agitator and the fan with one of the wheels to rotate them.

3. In a cotton duster, the combination of supporting wheels, a spindle carrying the same, a sleeve adapted to rotate on the spindle, a fan carried by the sleeve, a casing about the fan and having a rearward delivery nozzle, a hopper supported over the casing and adapted to deliver its contents into the casing, a gate adapted to limit the delivery from the hopper, an agitator in the hopper, gearing on one of the wheels and the agitator to rotate the latter, and gearing driven from one of the wheels and adapted to increase the speed of the fan.

4. In a cotton duster, the combination of a frame, a hollow spindle adapted to contain oil secured across the frame, wheels adapted to rotate on the spindle, a sleeve rotatable on the spindle, a fan carried by the sleeve, a casing about the fan and supported by the frame, a hopper having a chute delivering into the casing, a gate in the chute, an agitator in the hopper, an exterior gear wheel adapted to rotate the agitator, a driving gear wheel connected by differential ratchets with the wheels of the machine and adapted to rotate the agitator gear wheel, friction wheels adapted to drive the fan, and a speed increasing train of gear wheels interposed between the driving gear wheel and the friction wheels.

5. In a cotton duster, the combination of a frame, a hollow spindle transverse of the frame, drive and supporting wheels on the spindle, a fan concentric with the axis of the wheels, a casing about the fan, gearing means from the wheels to the fan and adapted to rotate it more rapidly than the wheels, and a hopper with an agitator and adapted to deliver its contents into the fan casing.

In testimony whereof I hereunto affix my signature.

ROBERT LEE WOODRUFF.